(12) United States Patent
Anderson (10) Patent No.: US 10,336,381 B2
(45) Date of Patent: Jul. 2, 2019

(54) TOE CONTROL FOR ADJUSTABLE AXLE

(71) Applicant: GVM INC., East Berlin, PA (US)

(72) Inventor: Mark W. Anderson, Aspers, PA (US)

(73) Assignee: GVM, Inc., Biglerville, PA (US)

( * ) Notice: Subject to any disclaimer, the term of this patent is extended or adjusted under 35 U.S.C. 154(b) by 0 days.

(21) Appl. No.: 15/683,132

(22) Filed: Aug. 22, 2017

(65) Prior Publication Data

US 2018/0050744 A1 Feb. 22, 2018

Related U.S. Application Data

(60) Provisional application No. 62/377,713, filed on Aug. 22, 2016.

(51) Int. Cl.
| | |
|---|---|
| *B62D 49/06* | (2006.01) |
| *B60K 35/00* | (2006.01) |
| *B62D 17/00* | (2006.01) |
| *B60G 9/00* | (2006.01) |
| *B60B 35/10* | (2006.01) |

(52) U.S. Cl.
CPC .......... *B62D 49/0678* (2013.01); *B60B 35/10* (2013.01); *B60B 35/1036* (2013.01); *B60B 35/1054* (2013.01); *B60G 9/00* (2013.01); *B60K 35/00* (2013.01); *B62D 17/00* (2013.01); *B60G 2200/30* (2013.01); *B60G 2200/462* (2013.01); *B60G 2200/4622* (2013.01); *B60G 2206/111* (2013.01); *B60G 2300/40* (2013.01); *B60K 2350/1004* (2013.01); *B60K 2350/106* (2013.01); *B60K 2350/1028* (2013.01)

(58) Field of Classification Search
CPC .... B62D 49/0678; B62D 17/00; B60B 35/10; B60B 35/1054; B60B 35/1036; B60K 35/00; B60K 2350/106; B60K 2350/1028; B60K 2350/1004; B60G 9/00; B60G 2200/462; B60G 2200/30; B60G 2300/40; B60G 2200/4622; B60G 2206/111
USPC .......................................................... 701/36
See application file for complete search history.

(56) References Cited

U.S. PATENT DOCUMENTS

| 5,121,808 A | * | 6/1992 | Visentini | ............... B60B 35/003 |
| | | | | 180/435 |
| 5,282,644 A | | 2/1994 | Larson | |
| 5,489,113 A | | 2/1996 | Torborg | |

(Continued)

FOREIGN PATENT DOCUMENTS

| EP | 1006075 A1 | 7/2000 |
| EP | 1502769 A2 | 2/2005 |

*Primary Examiner* — Muhammad Shafi (74) *Attorney, Agent, or Firm* — McNees Wallace & Nurick LLC (57) ABSTRACT

A method of regulating the operation of a vehicle axle system, the vehicle axle system including at least one adjustable axle having at least one axle cylinder and a steering assembly including at least one steering cylinder connected thereto, an axle management system including a microcontroller having a microprocessor, a memory, and a sensor. The method includes receiving, by the axle management system, at least one desired axle position and at least one measured axle position, from at least one sensor. The method also includes determining, if the measured axle position is within a predetermined tolerance threshold of the desired axle position and regulating the position of the at least one adjustable axle.

16 Claims, 7 Drawing Sheets

(56) References Cited

U.S. PATENT DOCUMENTS

| | | | | |
|---|---|---|---|---|
| 6,038,506 | A * | 3/2000 | Diekhans | B60K 23/04 180/247 |
| 6,895,317 | B2 * | 5/2005 | Yasui | B60G 17/0195 180/197 |
| 9,988,043 | B2 * | 6/2018 | Mahabadi | B60W 30/02 |
| 2005/0037222 | A1 * | 2/2005 | Narita | C23C 28/321 428/544 |
| 2005/0096830 | A1 * | 5/2005 | Ohta | B60K 28/165 701/91 |
| 2005/0125131 | A1 * | 6/2005 | Kato | B60T 8/172 701/70 |
| 2015/0306910 | A1 * | 10/2015 | Ruggeri | B60B 35/16 280/638 |

* cited by examiner

TOE CONTROL FOR ADJUSTABLE AXLE

FIELD OF THE INVENTION

The present invention is directed to control systems. More particularly, the present invention is directed to a control system to maintain the proper toe of a drive axle.

BACKGROUND OF THE INVENTION

Industrial and agricultural equipment are often employed in circumstances where it would be desirable to have an adjustable wheel base. For example, one type of crop may have different row spacing from another type of crop that necessitates different wheel spacing for the same piece of equipment to be used in both fields. As the wheel base changes the amount of toe necessary to facilitate efficient steering may also change.

BRIEF DESCRIPTION OF THE INVENTION

In an embodiment, a method of regulating the operation of a vehicle axle system. The vehicle axle system including at least one adjustable axle having at least one axle cylinder and a steering assembly including at least one steering cylinder connected thereto, and an axle management system including a microcontroller having a microprocessor, a memory, and a sensor. The method includes receiving, by the axle management system, at least one desired axle position. The method also includes receiving, by the axle management system, at least one measured axle position, from at least one sensor. The method also includes determining, by the axle management system, if the measured axle position is within a predetermined tolerance threshold of the desired axle position. The method also includes regulating, by the axle management system, the position of the at least one adjustable drive axle.

In another embodiment, a vehicle axle management system comprising a processor and a memory storing instructions that, when executed by the processor cause the vehicle axle management system to receive at least one desired axle position and receive at least one measured axle position, from at least one sensor. The vehicle axle management system also determines if the measured axle position is within a predetermined tolerance threshold of the desired axle position and regulate the position of at least one adjustable axle.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a control system for an adjustable axle. Embodiments of the present disclosure, for example, in comparison to concepts failing to include one or more of the features disclosed herein, provide a control system which is able to monitor and control both the wheel base and toe of an adjustable axle.

Figure 1:
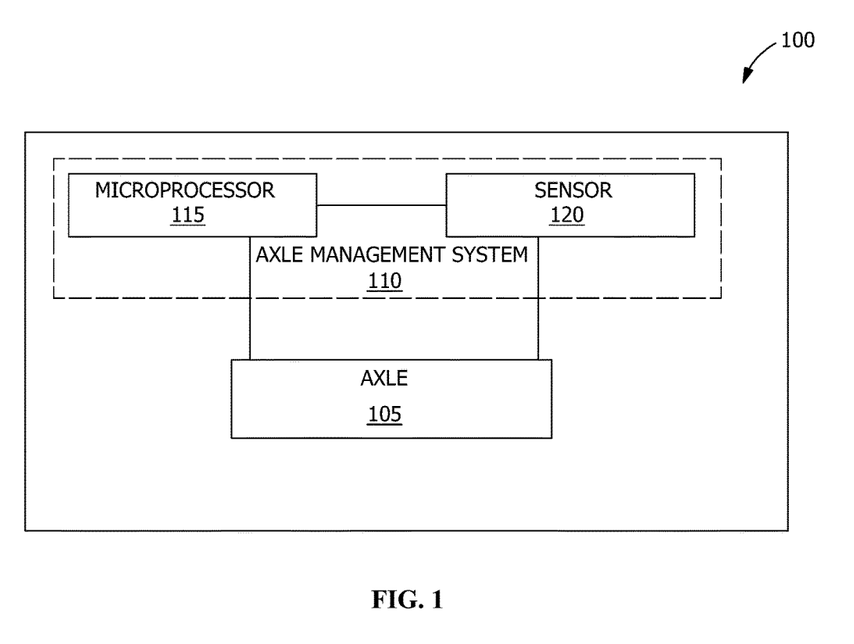
FIG. 1 is a block diagram of a vehicle axle system, according to an embodiment.

An embodiment of a vehicle axle system 100 is shown in FIG. 1. The vehicle axle system 100 includes an adjustable axle 105 which is communicatively connected to a vehicle axle management system 110. In one example, the adjustable axle 105 may be connected to the vehicle axle management system 110 via direct links (e.g., wires, fiber optics). In another example the adjustable axle 105 may be connected to the vehicle axle management system 110 via a wireless communication network. The vehicle axle management system 110 may include, a microcontroller 115 having an electronic processor, memory, and input/output components. The vehicle axle management system 110 may also include a user interface, a communication interface, and other computer implemented devices for performing features not defined herein.

In the example of FIG. 1, the memory of the microcontroller 115 stores computer-readable instructions that, when executed by the electronic processor of the microcontroller 115 cause the vehicle axle management system 110 and more particularly the microcontroller 115 to control or perform various functions or methods attributed to the vehicle axle management system 110 (e.g., regulate the operation of an adjustable axle). The vehicle axle management system 110 additionally includes at least one sensor 120 configured to provide at least one measurement (e.g., axle length, half axle length 125, and/or toe) to the microcontroller 115.

Figure 2:
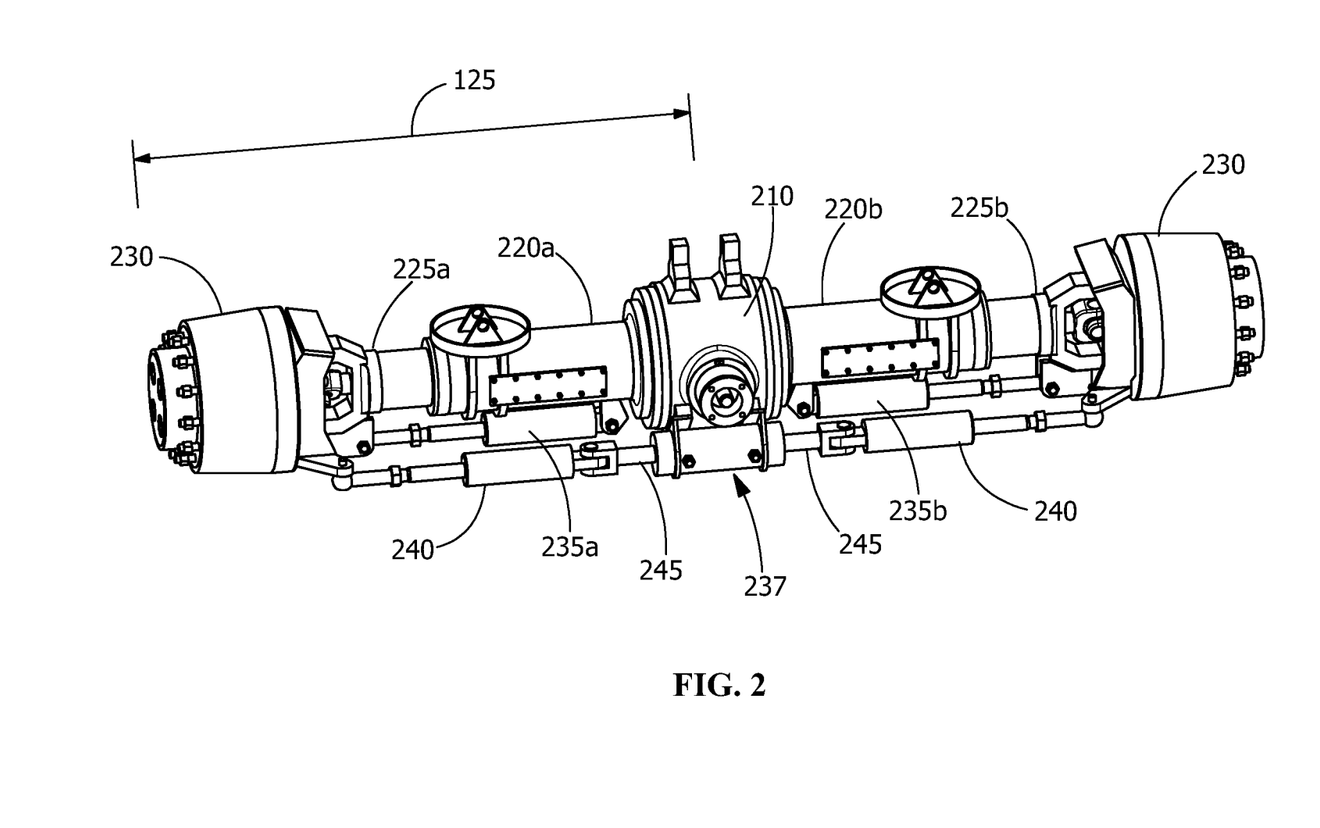
FIG. 2 is a perspective view of an axle, according to an embodiment.

In one embodiment, a suitable adjustable axle is described in U.S. 2015/0306910, which is incorporated herein by reference. An adjustable axle 200, similar to those found in U.S. 2015/0306910, is shown in FIG. 2. That drive axle includes a body 210 for containing a differential 215; fixed arms on opposite sides of the body 220a, 220b; two movable arms 225a, 225b, each slidingly inserted in a respective fixed arm 220a, 220b; a hub 230 connected to each movable arm to support respective wheels; and two adjustment actuators 235a, 235b, each active between a respective fixed arm 220a, 220b and the corresponding movable arm 225a, 225b to change the distance between hubs 230 between a minimum distance configuration and a maximum distance configuration. One advantage of adjustable axles such as in the example of FIG. 2 is that the length of the axle 200 can be automatically adjusted from the cab of the vehicle using a control system 110 that extends or retracts the movable arms 225a, 225b from within the fixed arms 220a, 220b.

Figure 3:
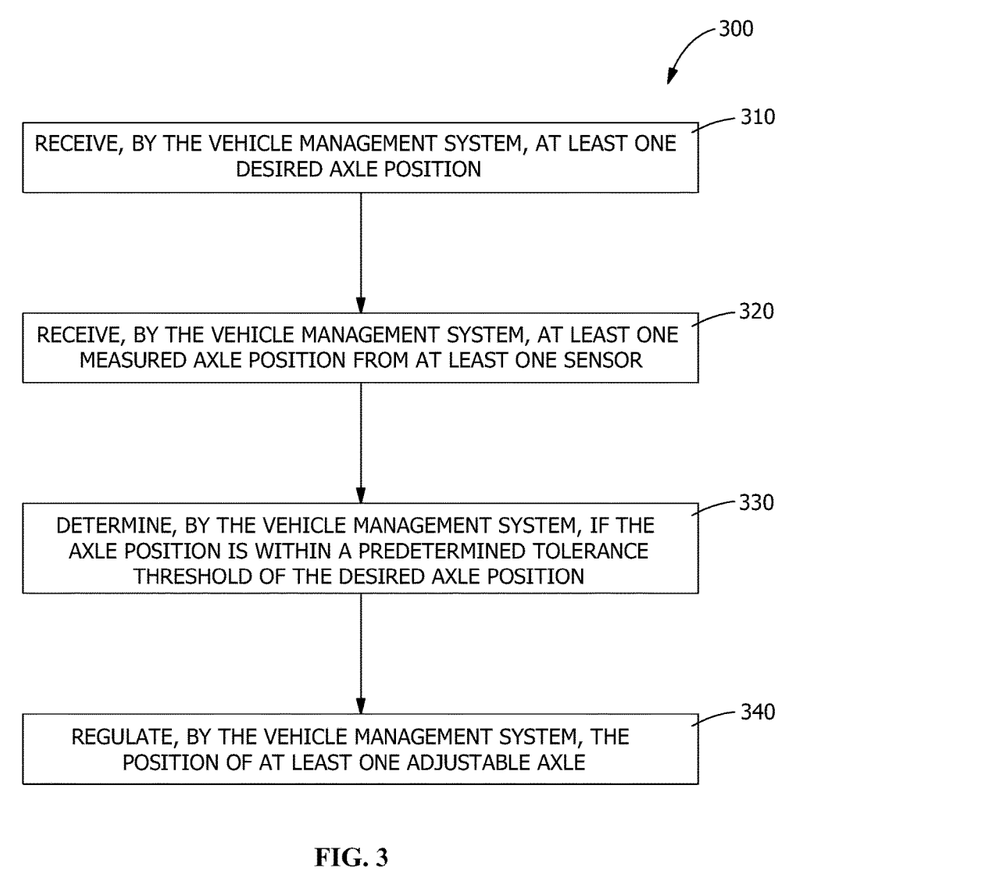
FIG. 3 is a flow chart of a method for controlling a vehicle axle system, according to an embodiment.

A flowchart of a method of regulating the operation of the vehicle axle system 100 is shown in FIG. 3. At block 310, the vehicle axle management system 110 receives at least one desired axle position (e.g., axle length, half axle length 125, and/or toe). At block 320, the vehicle axle management system 110 receives at least one measured axle position from the at least one sensor 120. At block 330, the vehicle axle management system 110 determines if the measured axle position is within a predetermined tolerance threshold of the desired axle position. At block 340, the vehicle axle management system 110 regulates the position of the at least one adjustable axle 105.

For example, if a distance change request is input from the operator (e.g. via a touchscreen or other user interface), a running average of half axle length 125 is taken over a predetermined period of time and then compared to the desired half axle length 125 requested by the operator. If the reading is within the predetermined tolerance threshold of the desired half axle length 125, the cylinder adjustment cycle is completed. If the half axle length 125 does not meet the called for criteria, the microcontroller 115 may execute a PID control algorithm causing the moveable arm 225 (also referred to herein as an axle cylinder) to extend or retract from the fixed arm 220 until the desired half axle length 125 is obtained. In some embodiments, use of an exponential filter can eliminate delays and efficiently stop the arm movement within the predetermined tolerance threshold. This control sequence is for a single cylinder, with each side of the axle 200 being adjusted independently of the other. The vehicle axle management system 110 may continually monitor the position of the axle 200 and regulate the position of the axle 200 to remain within the predetermined tolerance threshold.

The adjustable axle 200 may include a tie rod 237 (also referred to herein as steer controls), when used as the front axle of agriculture or industrial equipment. An adjustable steer cylinder 240 movable with respect to a corresponding fixed arm 245 may be provided on each side of the axle 200 to permit the steering control 237 to extend or retract as the axle extends or retracts, the steering cylinder 240 and fixed arm 245 employing an adjustment actuator and operating in an analogous manner as the axle cylinder 225 and its corresponding fixed arm 220.

The presence of steering controls 237 presents an extra complication because it presents a need to maintain the same toe at the different axle lengths. In some embodiments, the proper toe (e.g., −0.05 inches (−1.27 mm), −0.10 inches (−2.54 mm), −0.20 inches (−5.08 mm), +0.08 inches (+2.032 mm), +0.10 inches (+2.54 mm), +0.15 inches (+3.81 mm), +0.20 inches (+5.08 mm), +0.25 inches (+6.35 mm), +0.30 inches (+7.62 mm), +0.35 inches (+8.89 mm), +0.40 inches (+10.16 mm), +0.45 inches (+11.43 mm), +0.50 inches (+12.70 mm), +0.60 inches (+15.24 mm), +0.80 inches (+20.32 mm), +1.00 inches (+25.40 mm), or more than +1.00 inches (+25.40 mm)) may be initially set mechanically with the axle cylinders 225 and steering cylinders 240 matched to have the same travel for a target of the steer cylinder 240 the same as what the axle is +/− a tolerance. While the steering cylinder 240 will extend or retract via a control circuit that tracks the axle cylinder 225 (to which it is indirectly attached via the hub 230), it has been determined that the steering cylinder 240 may not travel exactly the same distance as the axle cylinder 225, a result of the various connections associated with the steering assembly.

While the difference in travel distance of the axle cylinder 225 versus steering cylinder 240 may be small, that difference can still be enough to knock the toe out of alignment. As those of ordinary skill in the art will appreciate, the toe is the amount by which the wheels are adjusted from parallel in the direction of travel and may be toward (toe-in) or away (toe-out) from the center of the vehicle. Typically, a slight toe-in is desired to better help the vehicle maintain a straight line path. The amount of toe-in is usually less than 1 inch, and more typically a toe-in of at least about +0.10 inches (+2.54 mm), at least about +0.15 inches (+3.81 mm), at least about +0.25 inches (+6.35 mm), less than about +0.75 inches (+19.05 mm), or less than about +0.5 inches (+12.70 mm) is employed, and combinations thereof, although it will be appreciated that the amount of toe may depend on a variety of factors including wheel diameter, etc.

Exemplary embodiments of the invention provide a toe control that measures and adjusts the amount of extension or retraction of the steering cylinder 240 in a similar manner to that described with respect to the axle cylinder 225. That cycle runs after the axle cylinder 225 adjustment is complete and instead of comparing the measured axle cylinder 225 length to the operator's desired length, the toe control cycle instead compares the difference between the axle cylinder 225 length and the steering cylinder 240 length to a desired toe.

Figure 4:
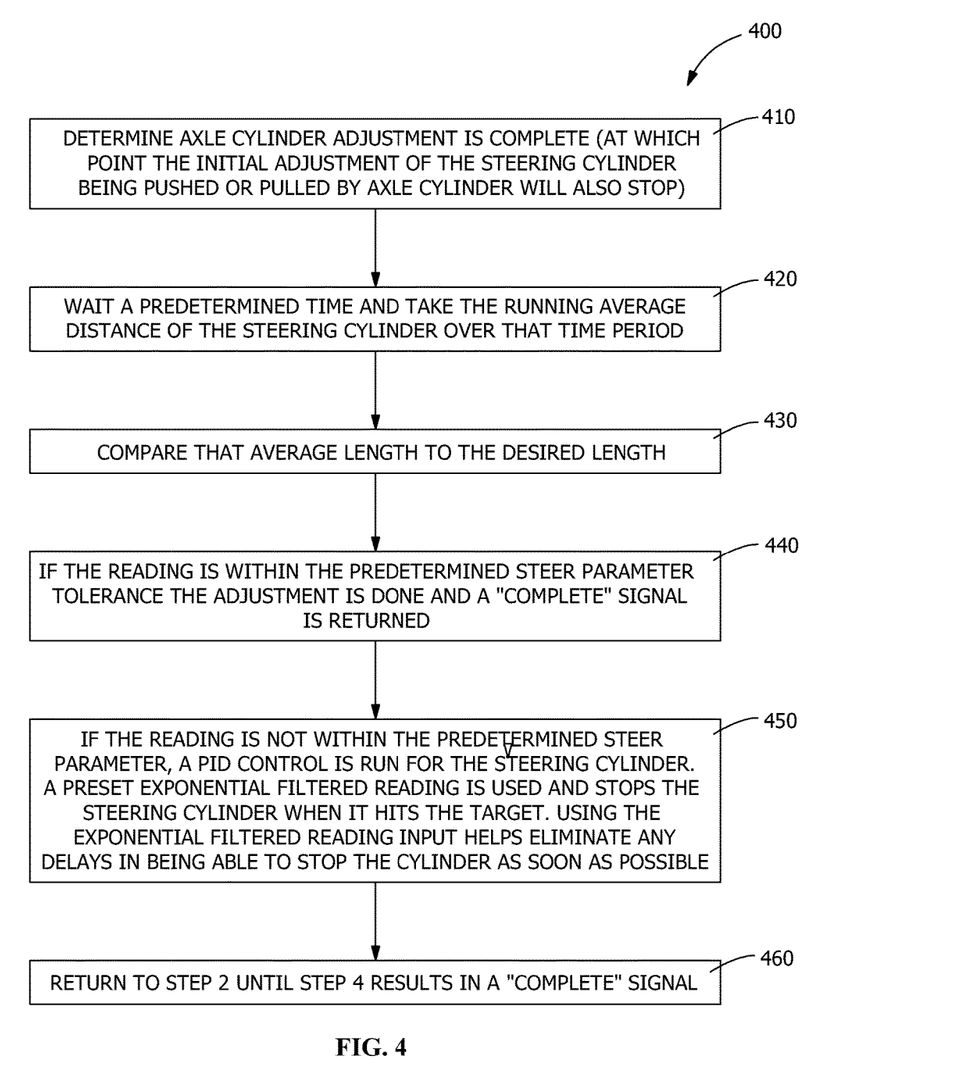
FIG. 4 is a flow chart of a method for controlling a vehicle axle system, according to an embodiment.

In one embodiment, the toe control operates in accordance with the following sequence for a single steering cylinder 240 (with the steering cylinders on each side of the axle 200 being controlled independently of one another just as with the axle cylinders 225), as shown in FIG. 4. At block 410, the vehicle axle management system 110 determines the axle cylinder 225 adjustment is complete (at which point the initial adjustment of the steering cylinder 240 being pushed or pulled by axle cylinder will also stop). At block 420, the vehicle axle management system 110 waits a predetermined time (e.g. 1 second) and takes the running average length of the steering cylinder 240 over that time period. At block 430, the vehicle axle management system 110 compares the average length to the desired length. At block 440, the vehicle axle management system 110 determines if the average length is within the predetermined steer parameter tolerance (e.g., +/−0.25 inches (+/−6.35 mm), +/−0.15 inches (+/−3.81 mm), +/−0.10 inches (+/−2.54 mm), +/−0.07 inches (+/−1.778 mm), +/−0.03 inches (+/−0.762 mm), or other predetermined amount of toe). If so, the adjustment is done and a "complete" signal is returned. At block 450, if the average length is not within the predetermined steer parameter tolerance, the vehicle axle management system 110 executes a PID controller to adjust the steering cylinder 240. A preset exponential filtered reading is used and stops the steering cylinder 240 when it hits the target. Using the exponential filtered reading input helps eliminate any delays in being able to stop the steering cylinder 240 within predetermined steer parameter tolerance. At block 460, the vehicle axle management system 110 returns to block 420 to monitor the axle 200 position.

The invention has been reduced to practice and a further example of its application is discussed with respect to the following figures (FIGS. 4-6) that show how the axle adjustment appears to an operator of the vehicle.

Figure 5:
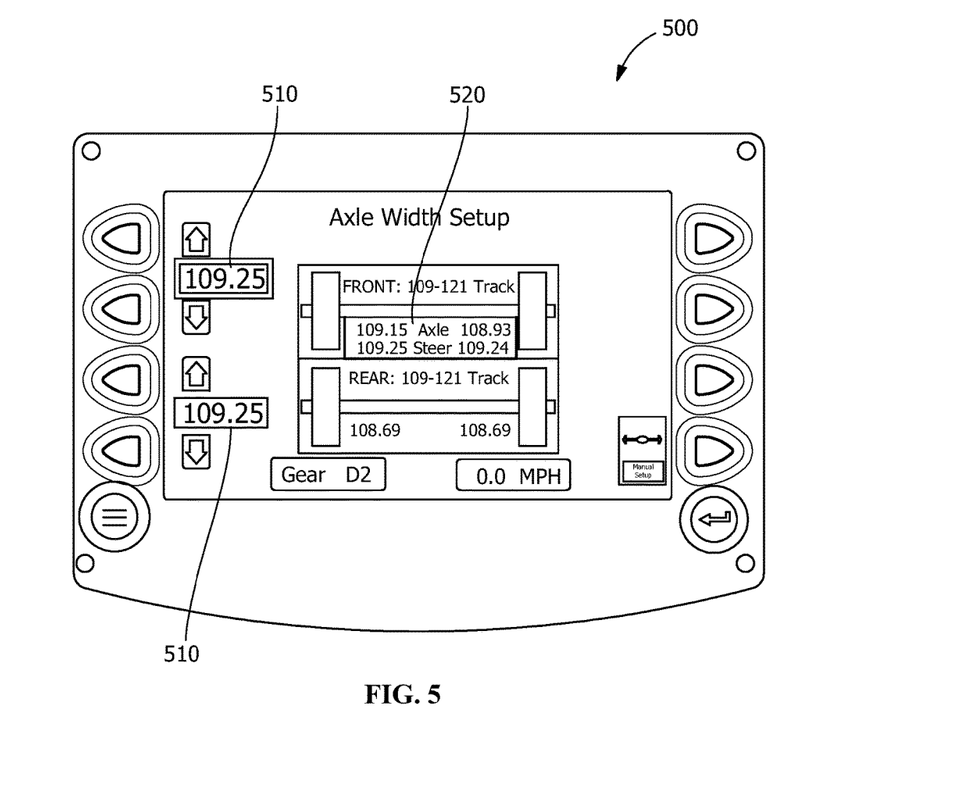
FIG. 5 is a perspective view of an axle adjustment menu, according to an embodiment.

FIG. 5 shows the axle adjustment menu 500, which reflects an ability to separately increase or decrease the desired length of the front and rear axles, which in this case is shown as 109.25 inches (2774.95 mm) on each side. A user may select a desired half axle length 125 using a touch screen control 510. In some embodiments, desired half axle lengths 125 may be independently selected for each axle present. The screen further includes a display region 520 which shows the actual, measured half axle lengths 125 and measured toes for each of the two axle cylinders, for both the front and rear axles (which are shown as something other than exactly 109.25 inches (2774.95 mm), but within a predetermined tolerance). The front axle further shows the length of the steering cylinders, with the difference in the steering and axle measurements representing the amount of toe (here, a toe-in of +0.10 inches (+2.54 mm) for the left front and +0.31 inches (+7.874 mm) for the right front).

Figure 6:
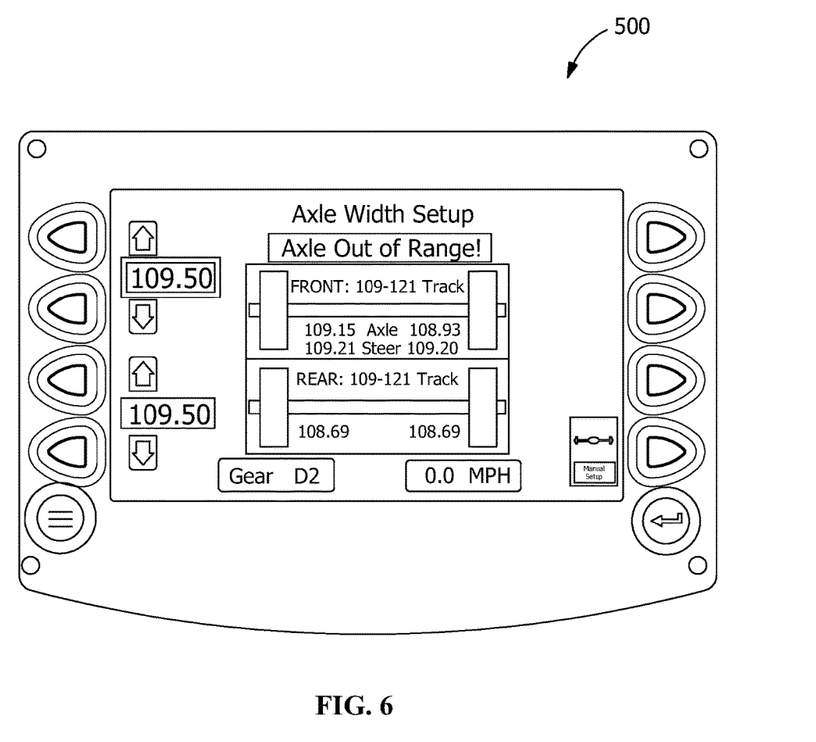
FIG. 6 is a perspective view of an axle adjustment menu, according to an embodiment.

FIG. 6 shows that the operator has selected a minor adjustment to the axle adjustment menu 500, increasing the axle length from 109.25 inches (2774.95 mm) to 109.50 inches (2781.30 mm) and the screen further shows that the current measured axle lengths are out of range (e.g. outside the predetermined tolerance) with respect to the called length. The control sequence to make the requested adjustment and bring the axle into the called range is initiated by the operator selecting the auto-fix button and then driving in a particular gear at a particular speed as may be pre-set in advance (e.g., $1^{st}$ or $2^{nd}$ gear at a speed of 3 to 6 mph (4.83 kph to 9.66 kph).

Figure 7:
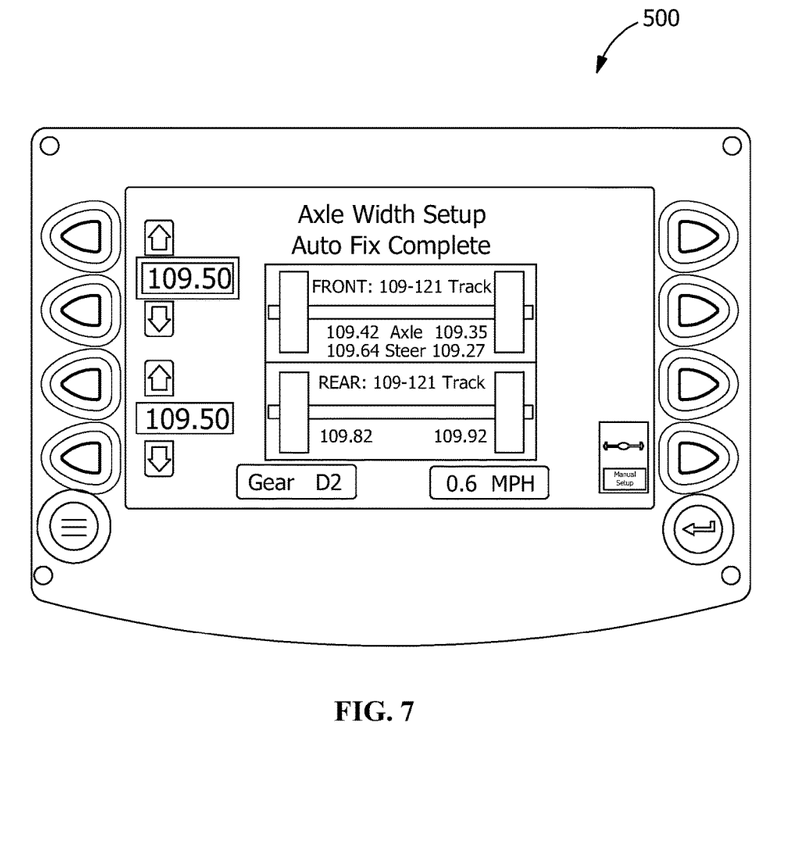
FIG. 7 is a perspective view of an axle adjustment menu, according to an embodiment.

FIG. 7 shows axle adjustment menu 500 after the axle cylinder control sequence has completed, with the cylinders for each of the front and rear axles adjusted from their prior setting to a new length within the predetermined tolerance. It can also be seen that as a result of adjusting the axle cylinders, the difference between the axle cylinder and the steering cylinder is no longer the same as what it was prior to the adjustment (a toe of +0.22 inches (+5.588 mm) for the left front and a toe of −0.08 inches (−2.032 mm) for the right front). In this case, for a pre-set toe-in of +0.25 inches (+6.35 mm), the toe control sequence would then run, resulting in no adjustment of the left front cylinder which is already in the range of the called toe, while the control sequence for the steering cylinder of the right front would further extend the steering cylinder relative to the axle cylinder to correct the measured toe-out condition and restore the toe to within the permitted tolerance level.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of regulating the operation of a vehicle axle system, the vehicle axle system including at least one adjustable axle having at least one axle cylinder and a steering assembly including at least one steering cylinder connected thereto, an axle management system including a microcontroller having a microprocessor, a memory, and a sensor, the method comprising:
   receiving, by the axle management system, at least one desired axle position, based on a crop row spacing;
   receiving, by the axle management system, at least one measured axle position, from at least one sensor;
   determining, by the axle management system, if the measured axle position is within a predetermined tolerance threshold of the desired axle position;
   regulating, by the axle management system, the position of the at least one adjustable axle, based on the at least one desired axle position;
   wherein regulating the position of the at least one adjustable axle causes adjustment of the position of the at least one adjustable axle.

2. The method of claim 1, wherein the at least one desired axle position is received from a user.

3. The method of claim 1, wherein the at least one desired axle position is received from the memory.

4. The method of claim 1, wherein the desired axle position includes a length of the axle.

5. The method of claim 1, wherein the desired axle position includes a toe of at least one wheel attached to the axle.

6. The method of claim 1, wherein regulating the position of the at least one adjustable axle includes regulating a position of the at least one axle cylinder or a toe of at least one wheel.

7. The method of claim 6, wherein regulating the position of the at least one adjustable axle includes regulating both the length of the at least one axle and the toe of the at least one wheel.

8. The method of claim 6, wherein the toe of the at least one wheel is in a toe-in position of between about 0.08 inches (2.032 mm) and about 0.50 inches (12.70 mm).

9. The method of claim 8, wherein the predetermined tolerance threshold includes a tow-in tolerance threshold of between about 0.03 inches (0.762 mm) and about 0.07 inches (1.778 mm).

10. The method of claim 1, wherein the regulating the position of the at least one adjustable axle causes adjustment of at least one axle length and at least one wheel toe.

11. A vehicle axle management system comprising a processor and a memory storing instructions that, when executed by the processor cause the vehicle axle management system to:
    receive, at least one desired axle position, based on a crop row spacing;
    receive, at least one measured axle position, from at least one sensor;
    determine, if the measured axle position is within a predetermined tolerance threshold of the desired axle position;
    regulate, the position of at least one adjustable axle, based on the at least one desired axle position;
    wherein regulate, the position of the at least one adjustable axle adjusts a position of the at least one adjustable axle.

12. The system of claim 11, wherein the position of the at least one adjustable axle includes a position of the at least one axle cylinder or a toe of at least one wheel attached to the at least one adjustable axle.

13. The system of claim 12, wherein the position of the at least one adjustable axle includes both the length of the at least one axle and the toe of the at least one wheel.

14. The system of claim 11, wherein the position of the at least one adjustable axle is regulated at least in part by at least one PID controller.

15. The system of claim 11, wherein determining the measured axle position includes an exponential filter.

16. The system of claim 11, wherein regulate, the position of the at least one adjustable axle adjusts a length of the at least one adjustable axle and a toe of at least one wheel.

* * * * *